3,121,757
VIBRATORY SORPTION SEPARATION PROCESS UTILIZING MOLECULAR SIEVES
Wayne J. Faust, Arlington Heights, Ill., assignor to Universal Oil Products Company, Des Plaines, Ill., a corporation of Delaware
No Drawing. Filed Oct. 28, 1960, Ser. No. 65,589
7 Claims. (Cl. 260—676)

This invention relates to an improvement in the process of separating mixtures of compounds with the aid of solid sorbents of the molecular sieve type whereby the rate of sorption and the capacity of the molecular sieve sorbent is enhanced and the quantity of feed stock subject to treatment in a given period of time may be substantially increased. More specifically, this invention relates to a separation process utilizing a molecular sieve sorbent, in which process the capacity and rate of sorption are substantially increased by conducting the process while the sorbent and feed stock are subjected to the effect of certain vibrations during the separation process.

In accordance with one of its embodiments this invention relates to a process for separating from a mixture of compounds a component of said mixture capable of being selectively sorbed by a solid sorbent containing pores having cross-sectional diameters which permit the entry of said selectively sorbable component, but which reject the components of the mixture having larger molecular diameters which comprises contacting said mixture with said sorbent at selective sorption conditions while simultaneously subjecting said mixture and said sorbent to vibrations having a frequency of at least 10 kilocycles per second during the period of contact between the sorbent and feed stock.

Several sorption-type processes utilizing specific sorbents are known and widely used for the separation of compounds on the basis of their molecular structure and/or chemical compositions, utilizing an inorganic sorbent containing pores in which one or more components of the mixture, belonging to a particular structural class of materials, are selectively sorbed and retained within the pores of the sorbent particles and from which one or more other components of the mixture, belonging to another class of substances are rejected by the sorbent and are not retained thereby. The sorbents having such selective sorbency are generally, but not necessarily, of the inorganic type, such as certain especially activated carbons, prepared, for example, by carbonization of acid sludges, activated coconut chars in the presence of carbon dioxide as the oxidizing agent, especially activated alumina, and a class of zeolite-type sorbents comprising certain metal alumino-silicates, particularly the dehydrated zeolitic alkali and alkaline earth metal alumino-silicates, which after dehydration of their water of crystallization contain pores of from about 4 to about 5 Angstrom units in cross-sectional diameter. The latter metal alumino-silicates have a high sorbent capacity for polar molecules and normal or straight chain organic compounds but reject certain non-polar gases and the branched chain and cyclic organic compounds because the cross-sectional diameters of the pores do not permit entry of compounds having larger molecular diameters than the straight chain components of the mixture. The activated carbons and alumina are also capable of selectively sorbing straight chain compounds, particularly hydrocarbons, while rejecting branched chain and cyclic compounds having molecular diameters greater than can be accommodated by the internal pores of the sorbent.

In the use of all of the foregoing classes of sorbents, as for example, in a typical separation process in which the mixture to be separated is contacted in the liquid or vapor phase with the sorbent which is generally maintained as a stationary bed, a certain, definite period of time is required between the initial contact of the feed mixture with the sorbent and the sorption of the selectively sorbable component of the feed stock mixture into the pores of the sorbent. Similarly, during the subsequent recovery stage of the process in which the selectively sorbed component is stripped from the sorbent, a definite and perceptible time lag is evident during which the selectively sorbed component is sorbed into or displaced from the pores of the sorbent. The resulting delays or time lags required for physical transfer of the selectively sorbed component into and out of the pores of the sorbent necessitate an accommodation in the process flow design for such delays and necessarily increase the cost of operating the process because of the necessity for increasing the volume of sorbent present in the system, the size of equipment handling the increased volume of sorbent and spreading the fixed costs of the process, such as labor, utilities and other costs over a longer period of time. Any suitable means which can be incorporated into the design of the process, therefore, which will tend to reduce the time lag involved in the physical transfer of selectively sorbed component into the sorbent during the sorption stage or out of the sorbent during the desorption stage will reduce the cost of operating the process and enhance its commercial feasibility. The present improvement in the sorption separation process has the net effect of increasing the rate of sorption and/or desorption, as well as increasing the capacity of the sieves for the selectively sorbed component during the separation process.

The improvement in the selective sorption process provided herein comprises subjecting the sorbent and feed stock mixture of compounds to vibrations having a certain minimum range of frequencies during the sorption and/or desorption stages of the process. The vibrations, acting on the feed stock mixture, including the component to be selectively sorbed by the sorbent, and also acting on the sorbent itself is believed to cause a vibration in the particles of sorbent and in the individual molecules of the feed stock mixture, resulting in greater access of the pores in the sorbent to the sorbable component of the feed stock and shifts the sorbable component into more direct alignment with the pores of the sorbent. The net effect of the application of said vibrations to the system, in any event, is to increase the rate of sorption and the capacity of the sorbent for the sorbable component.

Although the desired effects on the rate of sorption are noted over a broad range of frequencies of the vibrations, the preferred range of frequencies for a particular species of compound and for particular members of an homologous series of compounds varies over a considerable range from 10 kilocycles to 80 kilocycles per second. The vibrations may be transmitted to the fluid mixture and/or sorbent by various means, the best results being realized when the vibrations are applied in such manner that the vibrator is in direct contact with the fluid feed stock mixture, in direct contact with the bed or beds of sorbent particles or with the vibrator closely contiguous to the bed of sorbent or fluid feed stock without the dampening effect of solid materials or a layer of gas between the fluid feed mixture or the solid sorbent particles. Thus, it is preferred that solids or intervening gas phases be eliminated between the surface of the vibrator and the fluid feed stock or sorbent, the intervening gas phase tending to dampen the effect of the vibrations emanating from the surface of the vibrator to the column of solid sorbent. One of the preferred locations for the vibrator is at the bottom of the column or bed of molecular sieve particles, the vibrations thereby being transmitted directly to the column of fluid and/or the column of solid particles through which the feed stock flows during the separation process. The flow of the fluid phase may be in an upward or downward direction through the column of molecular sieve particles, with the raffinate stream being removed from the column at a point downstream from the point of inlet of the feed stock mixture into the column.

Following the sorption stage of the process in which the feed stock mixture is contacted with the bed of solid sorbent to effect separation of the selectively sorbable component, the sorbed component thus separated from the feed mixture may be recovered from the sorbent by a suitable desorption procedure wherein the selectively sorbed component is replaced or displaced from the sorbent. For this purpose a fluid which does not react chemically with the molecular sieve particles is passed in gaseous or liquid phase through the column of "spent" sorbent containing the selectively sorbed component for a time sufficient to remove the sorbed component and regenerate the sorbent for further use. The desorption is promoted by operation at elevated temperatures and at reduced pressures with respect to the sorption phase of the process. Suitable gaseous desorbents for this purpose include the light hydrocarbon gases, dried prior to contact with the sorbent, such as methane, ethane, propane, etc., nitrogen, carbon dioxide, carbon monoxide and others which do not chemically react with the molecular sieve sorbent. One of the preferred desorbents for this purpose is a homolog of the component of the feed stock mixture selectively sorbed by the sorbent. Thus, for example, if a normal hydrocarbon is being selectively sorbed from the feed stock mixture, a homolog having a lower or higher boiling point than the feed stock is preferably utilized as desorbent. A typical example of such desorption is the use of normal butane, for example, to effect the desorption of normal hexane which has been selectively sorbed in a preceding stage of the process on a calcined alumino-silicate sorbent having pore openings of about 5 Angstrom units in cross-sectional diameter. Such dehydrated alkaline earth alumino-silicates are capable of selectively sorbing normal compounds containing at least 4 carbon atoms per molecule, rejecting branched chain and cyclic compounds of the same carbon atom content.

The present invention contemplates effecting not only the sorption stage of the process, but also the desorption stage while the solid or fluid phases present in the separation column are subjected to the influence of the aforesaid vibrations. Thus, the rate of desorption is favorably increased by the application of the vibration to the stream of liquid desorbent or to the column of solid sorbent particles containing the selectively sorbed component. Such desorption is preferably carried out at temperatures above about 50° C., up to about 300° C., depending upon the desorbent utilized and the character of the feed stock.

The present invention is further illustrated with respect to several of its specific embodiments in the following example, which, however, are not intended to limit the generally broad scope of the invention necessarily in accordance therewith.

EXAMPLE I

A mixture of normal and branched chain paraffinic hydrocarbons was separated into a sorbate product fraction comprising the normal components of the mixture and a raffinate product fraction comprising the branched chain components of the fraction, utilizing a molecular sieve sorbent consisting of pelleted crystals of calcium alumino-silicate (Linde Products Company, 5A sieves) packed into a vertical column having feed stock and sorbent inlets at the top of the column and a product outlet stream at the bottom of the column. The column containing the sorbent particles is surrounded by a steam jacket to maintain the temperature of the fluid and solid phases within the column at a constant temperature of 100° C. A Narda Model NT–5005 magnetostrictive transducer, having an output of vibrations of 20 kilocycles frequency, powered by a Narda Model G–5002 magnetostrictive generator of 500 R.F. watt output was mounted at the top of the separation column, the horn of the transducer extending into the column of molecular sieve particles and in contact with fluid and sieve particles at the top of the column.

Normal pentane was charged into the column until the sieve particles were covered with the liquid hydrocarbon. Thereafter, a mixture of normal hexane and 2,3-dimethylbutane was introduced into the feed stock inlet at the top of the column, the normal hexane desorbing the previously sorbed normal pentane and pushing the normal pentane ahead of the feed stock front. The effluent stream, consisting first of normal pentane and thereafter of 2,3-dimethylbutane was collected in aliquot portions from the product outlet at the bottom of the column until normal hexane appeared in the effluent stream. In each case, the capacity and rate of sorption are determined for the column in one run with the transducer in place and in the next run, in the presence of fresh molecular sieve particles, without the transducer, each run being determined at essentially the same conditions of temperature and pressure and with the same charge stock. At the moment that normal hexane began to appear in the product effluent stream, as indicated by analysis of the latter effluent, the feed stock charged into the top of the column was discontinued and calculations thereafter made were based on a material balance of the components entering and leaving the sorption separation column.

In other runs, the transducer was placed at the bottom of the column of molecular sieves, the column thereby, in effect, resting on the vibrating horn of the transducer. With the feed stock and other feed streams being charged into the top of the apparatus, a column of liquid hydrocarbons also rested on the transducer horn in vibrating contact with the source of vibrations.

The first run in each set of runs was without the transducer and the second run was with the transducer in order to provide a basis for comparison and to thereby determine the effect of the transducer on the capacity and rate factors in the sorption separation process. The following Table I reports the results of the run without the transducer.

*Table I*

SORPTION SEPARATION OF N-HEXANE AND 2,3-DI-METHYLBUTANE MIXTURE WITH 5A MOLECULAR SIEVES

Liquid hourly space velocity: 1.52 volumes of feed/vol. sieves/hr.
Temperature: 100°C.
Pressure, p.s.i.g.: 250
Quantity of sieves: 221.7 grms.

| Time, Minutes | Fraction No. | Effluent, ml. | Charge, ml. | Effluent Composition [1] | | |
|---|---|---|---|---|---|---|
| | | | | n-$C_5$ | n-$C_6$ | 2,3-DMB |
| Charge Stock Composition | | 100 | | 0.12 | 17.6 | 82.2 |
| 12 | | 100 | | 100 | | |
| 16 | 2 | 125 | 127 | 99.6 | | 0.4 |
| 18 | 3 | 150 | 151 | 77.8 | | 22.2 |
| 23 | 5 | 190 | 195 | 42.7 | | 57.3 |
| 28 | 7 | 230 | 236 | 33.2 | 2.4 | 64.4 |
| 33 | 9 | 270 | 274 | 25.5 | 6.4 | 68.1 |
| 38 | 11 | 310 | 315 | 18.3 | 9.5 | 72.2 |
| 43 | 13 | 350 | 356 | 14.5 | 10.3 | 75.2 |
| 47 | 15 | 390 | 392 | 11.9 | 11.0 | 77.1 |
| 55 | 17 | 460 | 460 | 8.0 | 12.8 | 79.2 |
| 68 | 19 | 560 | 559 | 4.7 | 14.5 | 80.8 |
| 79 | 21 | 660 | 656 | 2.9 | 15.4 | 81.7 |
| 91 | 23 | 760 | 756 | 1.9 | 16.3 | 81.8 | n-$C_6$ sorbed: 32.4 ml.

Dynamic capacity: $\frac{\text{Wt. of n-}C_6 \text{ sorbed in run}}{\text{Wt. of n-}C_6 \text{ sorbed on standard}} = \frac{100 \times 32.4}{2.217 \times 17.4} = 84\%$.

[1] By infra-red analysis.

In the following run the same column used in the preceding run was charged with a fresh sample of Linde 5A molecular sieves from the same batch of molecular sieves utilized in the preceding run and the transducer was put into operation at the top of the column, normal pentane being charged initially into the column until it fills the column with liquid hydrocarbon at the same conditions maintained in the process during the foregoing run. Thereafter, normal pentane was displaced from the molecular sieve particles by normal hexane charged as a mixture thereof with 2,3-dimethylbutane at the same time that the transducer was put into operation, maintaining the contents of the column under the influence of ultrasonic vibrations, (20 kilocycles per second, 500 R.F. watts output). The following Table II presents the observed results of the operation utilizing ultrasonic vibration for the separation.

Table II

SORPTION SEPARATION OF N-HEXANE AND 2,3-DIMETHYLBUTANE MIXTURE WITH 5A MOLECULAR SIEVES IN THE PRESENCE OF ULTRASONIC VIBRATIONS

Liquid hourly space velocity: 1.525
Temperature, °C.: 100
Pressure, p.s.i.g.: 250
Quantity of sieves: 229.8 grms.

| Time, Minutes | Fraction No. | Effluent, ml. | Charge, ml. | Effluent Composition | | |
|---|---|---|---|---|---|---|
| | | | | n-C$_5$ | n-C$_6$ | 2,3-DMB |
| Charge Stock Composition | | | | 0.2 | 17.8 | 82.0 |
| 12 | 1 | 100 | 101 | 100 | | |
| | 2 | 125 | 124 | 98.8 | | 1.2 |
| 18 | 3 | 150 | 150 | 72.6 | | 27.4 |
| 23 | 5 | 190 | 191 | 49.9 | 0.4 | 49.7 |
| 28 | 7 | 230 | 231 | 35.9 | 2.6 | 61.5 |
| 33 | 9 | 270 | 270 | 24.8 | 4.2 | 71.0 |
| 37 | 11 | 310 | 312 | 18.3 | 5.2 | 76.5 |
| 42 | 13 | 350 | 354 | 13.3 | 7.1 | 79.6 |
| 47 | 15 | 390 | 389 | 9.9 | 9.1 | 81.0 |
| 55 | 17 | 460 | 460 | 5.3 | 12.8 | 81.9 |
| 67 | 19 | 560 | 559 | 2.1 | 15.8 | 82.1 |
| 79 | 21 | 660 | 658 | 1.1 | 16.9 | 82.0 |
| 91 | 23 | 760 | 754 | 0.5 | 17.3 | 82.6 | n-C$_6$ sorbed: 37.1.

Dynamic capacity: $\frac{100 \times 37.1}{2.298 \times 17.4} = 93\%$.

Inspection of the foregoing pair of runs, in the first run of which the separation was effected in the absence of the vibrator and in the second run of which the vibrator was operating during the separation process, indicates that normal hexane does not appear in the effluent as quickly in the separation utilizing the vibrator. When the above data was plotted on a graph of effluent composition versus effluent volume, the slope of the resulting curve is greater for the operation utilizing the ultrasonic vibrator than in the operation without the vibrator, indicating that a faster displacement of the normal pentane already on the molecular sieve particles by the normal hexane contained in the feed stock occurs when the separation is effected in the presence of the ultrasonic vibrator. A comparison of the rates in each of the runs shows that the average increase in rates of sorption and desorption is approximately 15 percent accompanying the use of the ultrasonic vibrator during the molecular sieve separation process.

Although the total capacity of the molecular sieve particles were not substantially increased by virtue of the application of ultrasonic vibrations to the separation column, the data indicates that the attainment of equilibrium between the normal paraffinic component present in the charge stock and the molecular sieve sorbent was approached at a much earlier stage of the sorption process than in the separation procedure in which the vibrations were not applied during the separation procedure. Thus, the number of sorption-desorption cycles capable of being completed within a given period of time is substantially greater in the case of applying ultrasonic vibrations to the molecular sieve sorbents and the system of components present in a sorption separation procedure than in the absence of such application of ultrasonic vibrations.

EXAMPLE II

In a sorption separation process in which the sorbent utilized in the separation procedure is again a calcium alumino-silicate, designated as Linde 5A molecular sieves, in a separation column of similar design to the one utilized in Example I above, using similar reaction conditions and procedure, except that a magnetostrictive transducer having a frequency of 80 kilocycles per second is tested in a series of runs comparing the results using the transducer and without the transducer, the increase in the rate of sorption as a result of the application of vibrations of 80 kilocycle frequency is approximately of the same order of magnitude as the increase in the rate of sorption resulting from the application of vibrations of 20 kilocycle frequency to the sorption separation system.

I claim as my invention:

1. A process for separating from a mixture of compounds a component of said mixture selectively sorbable by a solid sorbent containing pores having cross-sectional diameters which permit the entry of said selectively sorbable component but which reject the components of said mixture having larger molecular diameters which comprises contacting said mixture with said sorbent at selective sorption conditions while simultaneously subjecting said mixture and said sorbent to vibrations having a frequency of from 10 to 80 kilocycles per second during the contacting period.

2. The process of claim 1 further characterized in that said mixture of organic compounds is a mixture of normal and branched chain organic compounds containing at least 4 carbon atoms per molecule, and said sorbent is a metal alumino-silicate wherein said metal is selected from the alkaline earth metals.

3. The process of claim 2 further characterized in that said mixture of compounds is a mixture of normal and branched chain hydrocarbons and said sorbent is a dehydrated calcium alumino-silicate molecular sieve.

4. The process of claim 1 further characterized in that said vibrations are ultrasonic and have a frequency of from 20 to 80 kilocycles per second.

5. The process of claim 1 further characterized in that the sorbent containing the sorbed compound is subjected to desorption with a desorbent while simultaneously subjecting said desorbent and sorbent to said vibrations.

6. The process of claim 5 further characterized in that said desorbent is a homolog of the compound selectively sorbed by the sorbent.

7. The process of claim 5 further characterized in that said mixture of compounds comprises normal and branched chain hydrocarbons, said sorbent is a dehydrated alkaline earth alumino-silicate molecular sieve and said desorbent is a normal hydrocarbon homolog of the normal hydrocarbon of said mixture.

References Cited in the file of this patent

UNITED STATES PATENTS 2,449,051    Breth et al. _____ Sept. 14, 1948
2,920,037    Haensel _____ Jan. 5, 1960

OTHER REFERENCES

Olson: Acoustical Engineering, 1957, Van Nostrand Pub. Co., pg. 692.